(12) United States Patent
Hayes, Jr.

(10) Patent No.: US 7,523,155 B2
(45) Date of Patent: Apr. 21, 2009

(54) METHOD, SYSTEM AND PROGRAM PRODUCT FOR USING OPEN MOBILE ALLIANCE (OMA) ALERTS TO SEND CLIENT COMMANDS/REQUESTS TO AN OMA DM SERVER

(75) Inventor: Kent F. Hayes, Jr., Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 10/803,236

(22) Filed: Mar. 18, 2004

(65) Prior Publication Data

US 2005/0228847 A1  Oct. 13, 2005

(51) Int. Cl.
G06F 15/16 (2006.01)
(52) U.S. Cl. ............... 709/200; 709/223; 717/1; 717/3; 717/200; 717/168
(58) Field of Classification Search ............. 709/223, 709/200
See application file for complete search history.

(56) References Cited

U.S. PATENT DOCUMENTS

| | | |
|---|---|---|
| 6,389,464 B1 | 5/2002 | Krishnamurthy et al. |
| 2003/0038172 A1 | 2/2003 | Bodin et al. |
| 2003/0097422 A1 | 5/2003 | Richards et al. |
| 2005/0022182 A1* | 1/2005 | Mittal .................. 717/178 |
| 2005/0182697 A1* | 8/2005 | Rao .................... 705/28 |
| 2006/0212558 A1* | 9/2006 | Sahinoja et al. .......... 709/223 |

FOREIGN PATENT DOCUMENTS

WO   WO 00/78005 A2   12/2000

OTHER PUBLICATIONS

Inspec, An 6433075, Arsdall et al., "National Ignition Facility Integrated Computer Control System", Proceedings of the SPIE, The International Society for Optical Engineering, vol. 3492, pp. 538-548, 1999.
Hanson et al., "A Flexible and Recoverable Client/Server Database Event Notification System", The VLDB Journal, pp. 12-24, 1998.
IBM TDB/RD, "Encapsulated Platform Independent Installation Object", RD No. 451, Article 148, p. 1959, Nov. 2001.
Weiss et al., "Goal-Oriented Software Assesment", ICSE '02, May 19-25, 2002, pp. 221-231.
Steve Zwart, "Bloodhound Server Monitor Package", Jul. 2000, Research Disclosure No. 435, Article 152, p. 1289.
Mamada, R., "A Software Managing Clustered Multi Vender Uninterruptible Power Supply on Network", Mar. 1999, Research Disclosure No. 419, vol. 42, Article 419103.

* cited by examiner

Primary Examiner—Jude J Jean Gilles
(74) Attorney, Agent, or Firm—Andre Gibbs; Hoffman Warnick LLC

(57) ABSTRACT

Under the present invention, there is provided a method, system and program product for using Open Mobile Alliance (OMA) Device Management (DM) alerts to send client commands/requests to an OMA DM server to initiate management actions on the OMA server. The method comprises: sending an OMA DM alert from a client device to an OMA DM server to initiate a management action on the OMA DM server; and in response to the OMA DM alert, sending a reply from the OMA DM server to the client device.

5 Claims, 4 Drawing Sheets

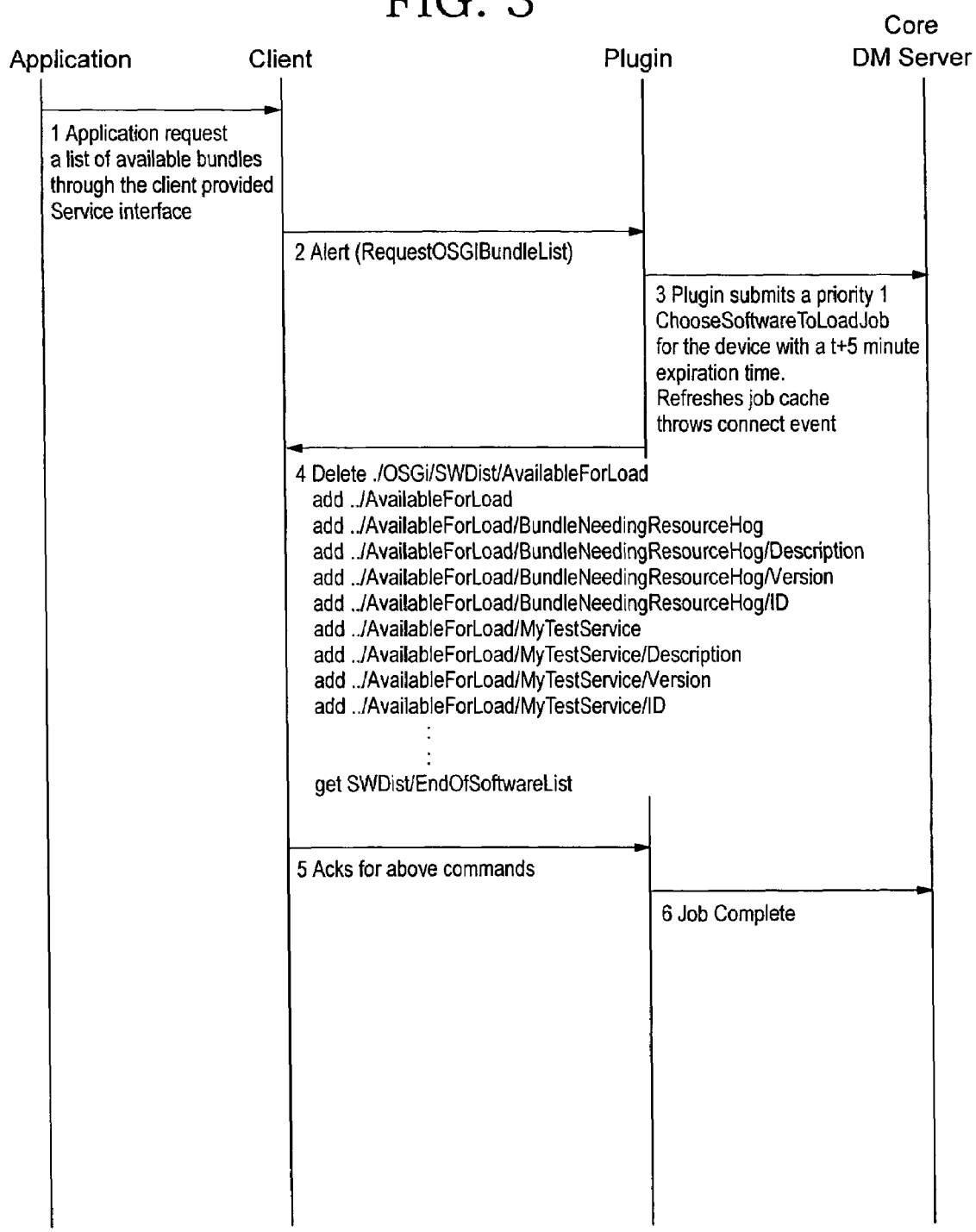

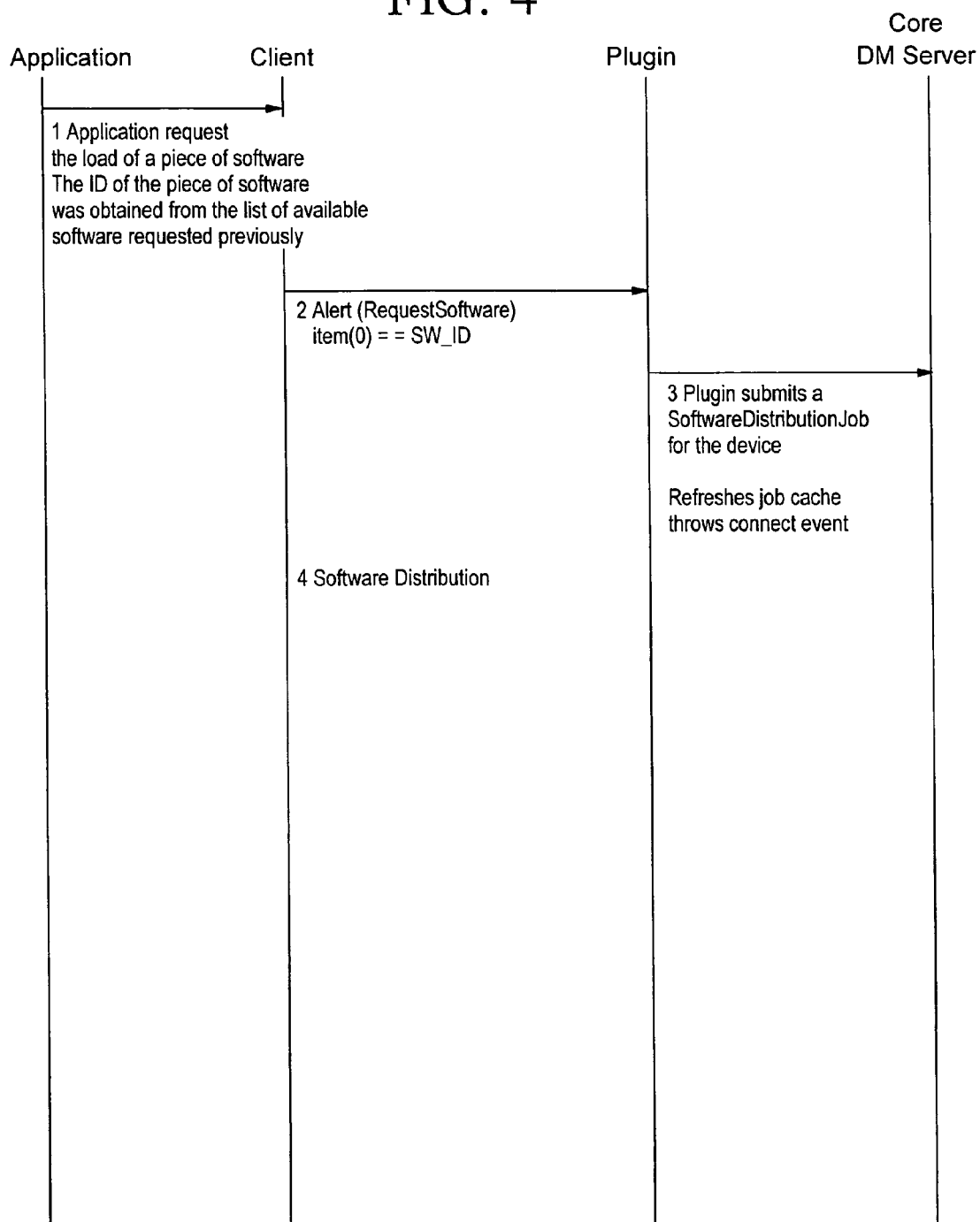

METHOD, SYSTEM AND PROGRAM PRODUCT FOR USING OPEN MOBILE ALLIANCE (OMA) ALERTS TO SEND CLIENT COMMANDS/REQUESTS TO AN OMA DM SERVER

BACKGROUND OF THE INVENTION

1. Field of the Invention

The present invention provides a method, system and program product for using Open Mobile Alliance (OMA) device management (DM) alerts to send client commands/requests to an OMA DM server.

2. Related Art

Device management (DM) technology enables the customization, personalization, and servicing of client devices such as wireless phones, personal digital assistants, and embedded technology in cars, houses, clothes, etc. Essentially, DM encompasses all of the necessities for remotely configuring, updating, and repairing client devices operating in the field.

One known technology for enabling DM is SyncML/DM, now referred to as OMA DM. As is known in the art, OMA DM specifies mechanisms and protocols that help achieve management of devices. OMA DM is used to set and retrieve management information from devices where management information consists of data such as configuration settings, user preferences, application settings, software and firmware updates, etc.

Currently, an OMA DM server initiates and controls management actions with a client device. For example, the OMA DM server can ask for client device information (e.g., status, queued events, application information, current parameters, etc.), send management commands (e.g., content/application download, parameter settings, etc.), collect results from the client device, as well as perform other management functions. Unfortunately, however, OMA DM fails to provide a convenient way for a client device to send a command/request to an OMA DM server for a management action to be performed.

In view of the foregoing, there exists a need for a method, system and program product for using OMA DM alerts to send client commands/requests to an OMA DM server. The commands/requests in the OMA DM alerts may include, for example, a request for a list of software (e.g., applications) available for distribution to the client device from the OMA DM server, and a command/request for the distribution of a piece of software from the list of available software to the client device.

SUMMARY OF THE INVENTION

In general, the present invention provides a method, system and program product for using OMA DM alerts to send client commands/requests to an OMA DM server.

A first aspect of the present invention provides a computer-implemented method comprising: sending an Open Mobile Alliance (OMA) device management (DM) alert from a client device to an OMA DM server to initiate a management action on the OMA DM server; and sending a reply from the OMA DM server to the client device in response to the OMA DM alert.

A second aspect of the present invention provides a computerized system, comprising: a command/request system for sending an Open Mobile Alliance (OMA) device management (DM) alert from a client device to an OMA DM server to initiate a management action on the OMA DM server; and a request processing system for sending a reply from the OMA DM server to the client device in response to the OMA DM alert.

A third aspect of the present invention provides a program product stored on a recordable medium, comprising: program code for sending an Open Mobile Alliance (OMA) device management (DM) alert from a client device to an OMA DM server to initiate a management action on the OMA DM server; and program code for sending a reply from the OMA DM server to the client device in response to the OMA DM alert.

A fourth aspect of the present invention provides a computer-implemented method, comprising: sending a notification from a client device to an Open Mobile Alliance (OMA) device management (DM) server to initiate a management action on the OMA DM server; and sending a reply from the OMA DM server to the client device in response to the notification.

Therefore, the present invention provides a method, system and program product for using OMA DM alerts to send client commands/requests to an OMA DM server.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a method flow diagram of a first detailed example according to the present invention.

FIG. 4 depicts a method flow diagram of a second detailed example according to the present invention The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

In general, the present invention provides a method, system and program product for using OMA DM alerts to send client commands/requests to an OMA DM server. Specifically, under the present invention, a client device running in an OSGi environment sends an alert, in the form of an OMA DM alert, to an OMA DM server to initiate an action (e.g., a client device management action) on the OMA DM server. For example, the client device may send a command/request or notification, using an OMA DM alert, to the OMA DM server for a list of available applications on the server, for a list of available software updates on the server (e.g., application updates, operating system updates, etc.), and/or for other available items on the server that may be required by the client device. In addition, once such a list(s) is provided by the OMA DM server to the client device, the client device may send a command/request, again using an OMA DM alert, for the distribution of available item(s) on the server to the client device. Although the present invention is described herein with regard to client device initiated management actions, such as requesting an application list from an OMA DM server and requesting an application from the application list, it should be apparent that the present invention may be used by a client device to initiate a wide variety of other actions. Further, although the present invention is described herein with regard to an OSGi environment, it should be apparent that the present invention may be used within other suitable computing environments.

Figure 1:
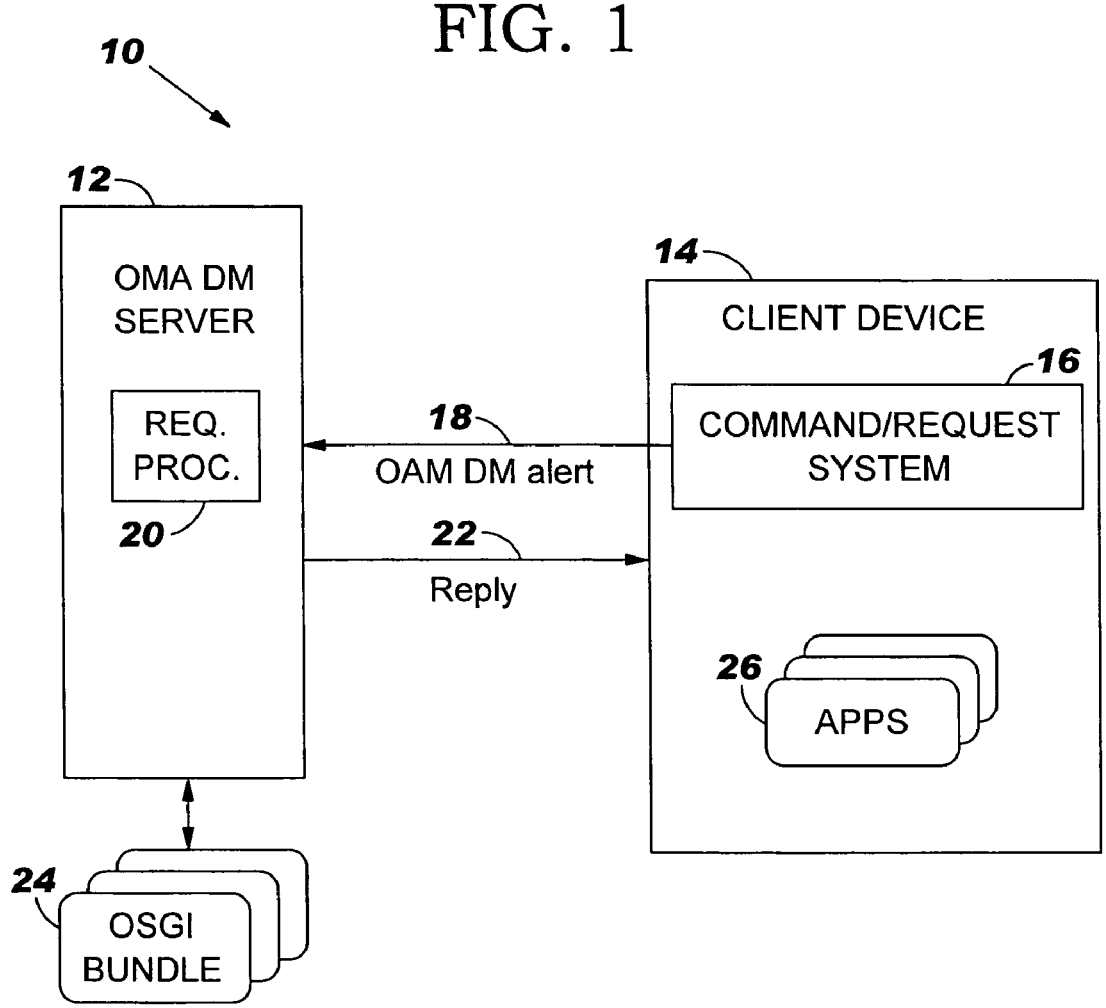
FIG. 1 depicts an illustrative system that uses OMA DM alerts to send client commands/requests to an OMA DM server according to the present invention.

Referring now to FIG. 1, an illustrative system 10 for using OMA DM alerts to send client commands/requests to an OMA DM server according to the present invention is shown. As depicted, system 10 includes an OMA DM server 12 and at least one client device 14 (a single client device is shown for illustrative purposes only). It should be understood that the architecture shown herein is illustrative only and will likely include other known components not shown. It is assumed for the purposes of this description that the reader has an understanding of OMA DM and OSGi commensurate with one skilled in the art. Accordingly, a detailed description of OMA DM and OSGi is not provided herein. Information regarding OMA may be found, for example, at www.openmobilealliance.org/syncml/. Information regarding OSGi can be found, for example, at www.osgi.org/resources.

Client device 14 is intended to represent any type of computerized device capable of communicating over a network. For example, client device 14 could be a desktop computer (e.g., WIN-32-based), a hand held device, a set top box, a home appliance, a security system, etc.

OMA DM server 12 and client device 14 typically communicate over any type of network such as the Internet, a local area network (LAN), a wide area network (WAN), a virtual private network (VPN), etc. As such, communication between OMA server 12 and client device 14 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, client device 14 could utilize an Internet service provider to establish connectivity to OMA server 12.

The client device 14 includes a command/request system 16 for sending an alert, in the form of an OMA DM alert 18, to a request processing system 20 in the OMA DM server 12 to initiate an action (e.g., a client device management action) on the OMA DM server 12. In response to the OMA DM alert 18, the request processing system 20 in the OMA DM server 12 sends a reply 22 to the client device 14. Depending upon the content of the OMA DM alert 18, the reply 22 sent by the OMA DM server 12 to the client device 14 may comprise a list of available software (a list of available OSGi bundles 24 in this example), the software itself (e.g., in an OSGi bundle 24), a request for additional information, a command/request denial, prerequisite requirements, instructions, data, etc. As known, an OSGi bundle is essentially a .JAR or .ZIP file with certain characteristics which enable it to effectively interact with the OSGi framework. In other embodiments of the present invention, a SNMP Trap, a TEC Event, or a SyncML DM alert may be used in lieu of the OMA DM alert 18.

Figure 2:
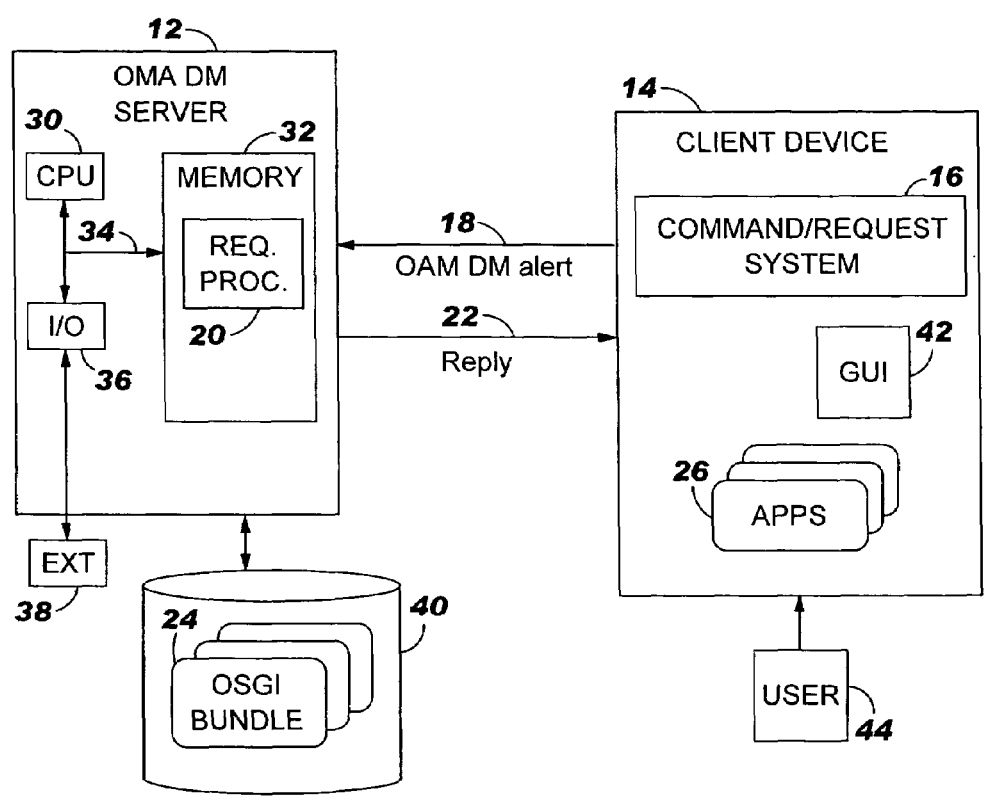
FIG. 2 depicts the system of FIG. 1 in greater detail.

Referring now to FIG. 2, a more detailed diagram of FIG. 1 is shown. As shown, the OMA DM server 12 generally comprises central processing unit (CPU) 30, memory 32, bus 34, input/output (I/O) interfaces 36, external devices/resources 38 and storage unit 40. CPU 30 may comprise a single processing unit, or be distributed across one or more processing units in one or more locations, e.g., on a client and server. Memory 32 may comprise any known type of data storage and/or transmission media, including magnetic media, optical media, random access memory (RAM), read-only memory (ROM), a data cache, etc. Moreover, similar to CPU 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LCD screen, handheld device, keyboard, mouse, voice recognition system, speech output system, printer, monitor/display, facsimile, pager, etc. Bus 34 provides a communication link between each of the components in OMA server 12 and likewise may comprise any known type of transmission link, including electrical, optical, wireless, etc.

Storage unit 40 can be any system (e.g., database, repository, etc.) capable of providing storage for information under the present invention. Such information could include, for example, software (OSGi bundles 24 in this example), prerequisite information, device drivers, data, etc. As such, storage unit 40 could include one or more storage devices, such as a magnetic disk drive or an optical disk drive. In another embodiment, storage unit 40 includes data distributed across, for example, a local area network (LAN), wide area network (WAN) or a storage area network (SAN) (not shown). Although not shown, additional components, such as cache memory, communication systems, system software, etc., may be incorporated into the OMA DM server 12. In addition, it should also be appreciated that although not shown, client device 14 would likely include computerized components similar to OMA DM server 12.

Shown in memory 32 of OMA DM server 12 is request processing system 20. The request processing system 20 receives an OMA DM alert 18 from the client device 14, and sends a corresponding reply 22 to the client device 14. It should be understood that the request processing system 20 includes program code/logic for carrying out the functions described herein. To this extent, the request processing system 20 could be realized as a plugin or the like.

The OMA DM alert 18 may be initiated in response to a wide variety of manual or automated activities. For example, a virus scan application 26 on the client device 14 may require updated virus definitions. Accordingly, an OMA DM alert 18 indicating the need for the updated virus definitions will be sent to the OMA DM server 12. The OMA DM alert 18 may be initiated automatically (e.g., once a week) by the virus scan application and/or may be manually initiated (e.g., via a graphical user interface (GUI) 42 presented to a user 44 of the client device 14). In response, the OMA DM server 12 will send a reply 22 including an updated set of virus definitions to the client device 14, which will then be installed by the virus scan application 26. Another example of an event that may initiate an OMA DM alert 18 can occur when a new printer or other peripheral is connected to the client device 14. Upon connection of the peripheral, the client device 14 may query the OMA DM server 12, via an OMA DM alert 18, regarding the availability of an updated device driver for the peripheral. In response, if an updated device driver for the peripheral is available, the OMA DM server 12 will send a reply 22 including the updated device driver to the client device 14. If an updated device driver for the peripheral is not available, the OMA DM server 12 will send a reply 22 to the client device 14 informing the client device 14 that it does not have an updated device driver for the peripheral. It will be apparent that these alert-reply examples are intended to be illustrative only, and that many other alert-reply scenarios are possible.

Referring now to FIG. 3 in conjunction with the system shown in FIG. 2, a method flow diagram of a detailed example according to the present invention is illustrated. In this example, the client device 14 sends a request to the OMA DM server 12 for a list of OSGi bundles 24 (e.g., applications) available for distribution to the client device 14.

In step 1, an application 26 running on the client device 14 send a request to an OSGi agent (e.g., command/request system 16) on the client device 14 for a list of available software (OSGi bundles 24 in this example) on the OMA DM server 12. The application 26 communicates to the client device 14 through a service interface. In step 2, the client device 14 sends alerts to a plugin (e.g., request processing system 20) on the OMA DM server 12. The first alert connects the client device 14 to the OMA DM server 12. The client device 14 also sends an OMA DM alert 18 containing the command "RequestOSGibundleList," to the plugin.

In step 3, in response to receipt of the command "RequestOSGibundleList," the plugin submits a priority 1 command "ChooseSoftwareToLoadJob." This is a priority 1 job with an expiration time of t+5 minutes. The plugin then makes sure the job cache is up to date and sends the connect event for the client device 14 to the OMA DM server 12.

In step 4, the plugin sends commands to the client device 14 to remove the old information from the "AvailableSoftwareToLoad" branch of the tree, and to create leaves and nodes describing the software available on the OMA DM server 12. It should be noted that one of the items is an ID—this may be used in a subsequent request by the application 26 for a load of an associated piece of software. Step 4 is listed below in greater detail:

Delete ./OSGi/SWDist/AvailableForLoad
add ../AvailableForLoad
add ../AvailableForLoad/BundleNeedingResourceHog
add ../AvailableForLoad/BundleNeedingResourceHog/Description
add ../AvailableForLoad/BundleNeedingResourceHog/Version
add ../AvailableForLoad/BundleNeedingResourceHog/ID
add ../AvailableForLoad/MyTestService
add ../AvailableForLoad/MyTestService/Description
add ../AvailableForLoad/MyTestService/Version
add ../AvailableForLoad/MyTestService/ID
get SWDist/EndOfSoftwareList In step 5, the client device 14 sends acknowledgments to the plugin for the commands in step 4. In step 6, the plugin sends a job completion event to the OMA DM server 12 and the job is marked as complete.

A flow diagram illustrating an example of a client initiated software request is illustrated in FIG. 4. In step 1, an application 26 running on the client device 14 sends a request to an OSGi agent (e.g., command/request system 16) on the client device 14 for the distribution of a piece of available software. This software is identified via a software ID that was obtained from the list of available software detailed in the previous example. In step 2, the client device 14 sends alerts to the plugin. The first alert connects the client device 14 to the OMA DM server 12. The client device 14 also sends an OMA DM alert 18 containing the command "RequestSoftwareLoad" with the software ID being the first element of the Alerts Items list.

In step 3, the plugin submits a SoftwareDistributionJob for the client device 14 to OMA DM server 12 for the requested piece of software. The plugin makes sure the job cache is up to date and sends the connect event for the client device 14 to the OMA DM server 12. In step 4, the requested software is distributed from OMA DM server 12 to the client device 14.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the scope of the invention includes the use of various alerts and notifications in addition to OMA alerts, including but not limited to, SNMP Traps, TEC Events, SyncML DM alerts, etc.

I claim:

1. A computer-implemented method, comprising:
   sending an Open Mobile Alliance (OMA) device management (DM) alert from a client device running in an OSGi environment to an OMA DM server to initiate a client device management action on the OMA DM server, wherein the OMA DM alert is sent by the client device to the OMA DM server in response to a connection of a peripheral to the client device, and wherein the OMA DM alert comprises a query regarding an availability of an undated device driver for the peripheral; and
   sending a reply from the OMA DM server to the client device in response to the OMA DM alert, wherein, if an undated device driver for the peripheral is available on the OMA DM server, the reply sent from the OMA DM server to the client device includes the undated device driver in an OSGi bundle, and wherein, if an undated device driver for the peripheral is not available on the OMA DM server, the reply sent from the OMA DM server to the client device informs the client device that an undated device driver is not available for the peripheral.

2. The method of claim 1, further comprising:
   sending, by the client device, a second OMA DM alert to the OMA DM server, wherein:
   the second OMA DM alert sent by the client device to the OMA DM server comprises a command/request for a list of software on the OMA DM server available for distribution to the client device, and wherein the reply sent from the OMA DM server to the client device comprises the list of available software.

3. The method of claim 2, further comprising:
   sending a third OMA DM alert from the client device to the OMA DM server, wherein the third OMA DM alert comprises a command/request for selected software on the list of available software.

4. The method of claim 3, wherein:
in response to the third OMA DM alert, sending the selected software from the OMA DM server to the client device in an OSGi bundle.

5. The method of claim 1, further comprising:
sending, by the client device, a second OMA DM alert to the OMA DM server, wherein:
the second OMA DM alert sent by the client device to the OMA DM server comprises a command/request for software on the OMA DM server, and wherein the reply sent from the OMA DM server to the client device comprises the software in an OSGi bundle.

* * * * *